US005898386A

United States Patent [19]

Kaihatsu

[11] Patent Number: 5,898,386

[45] Date of Patent: Apr. 27, 1999

[54] ELECTRONIC APPLIANCE SYSTEM, ELECTRONIC APPLIANCE AND REMOTE CONTROLLER

[75] Inventor: Chihiro Kaihatsu, Kanagawa, Japan

[73] Assignee: Sony Corporation, Tokyo, Japan

[21] Appl. No.: 08/706,607

[22] Filed: Sep. 5, 1996

[30] Foreign Application Priority Data

Sep. 8, 1995 [JP] Japan .................................... 7-257120

[51] Int. Cl.[6] ........................................ H04Q 9/00

[52] U.S. Cl. ................................ 340/825.69; 340/825.62; 341/176; 455/151.4; 396/57

[58] Field of Search ......................... 340/825.69, 825.72, 340/825.57, 825.53, 825.62; 341/176, 22, 34; 455/151.1, 151.2, 151.4; 396/57, 297, 299

[56] References Cited

U.S. PATENT DOCUMENTS

| | | | |
|---|---|---|---|
| 4,728,949 | 3/1988 | Platte et al. | 340/825.69 X |
| 4,746,919 | 5/1988 | Reitmeier | 340/825.69 X |
| 5,148,159 | 9/1992 | Clark et al. | 340/825.69 X |
| 5,451,953 | 9/1995 | Duffield | 340/825.69 X |
| 5,636,056 | 6/1997 | Nakashima et al. | 340/825.69 X |
| 5,650,774 | 7/1997 | Drori | 340/825.69 X |
| 5,729,210 | 3/1998 | Kiriyama | 340/825.69 X |
| 5,760,701 | 6/1998 | Mitsumoto | 340/825.69 X |

*Primary Examiner*—Edwin C. Holloway, III
*Assistant Examiner*—William H. Wilson, Jr.
*Attorney, Agent, or Firm*—Frommer Lawrence & Haug, LLP.; William S. Frommer

[57] ABSTRACT

A remote controller has an ID signal generating means for generating a unique identifying signal that is exclusive to a particular set of the remote controller and an electronic appliance. The electronic appliance has storage means for storing the ID signal. In response to an instruction through entry means, the remote controller transmits the unique ID signal from the ID signal generating means, and the electronic appliance receives the unique ID signal and stores it in its storage means.

4 Claims, 6 Drawing Sheets

ELECTRONIC APPLIANCE SYSTEM, ELECTRONIC APPLIANCE AND REMOTE CONTROLLER

BACKGROUND OF THE INVENTION

1. Field of the Invention

This invention relates to an electronic appliance system, an electronic appliance and a remote controller for controlling the electronic appliance.

2. Related Art

Most of recent electronic appliances including television sets, VTRs, and so forth, are equipped with a remote controller and can be controlled from distant locations. With an increase of electronic appliances that can be controlled by remote controllers, it may happen that a plurality of electronic appliances using the same code system are put in near places, which may cause a remote controller for an electronic appliance to unexpectedly activate other electronic appliances using the same code simultaneously. Especially for camera-integral VTRs each equipped with a remote controller, there is a high possibility that some persons use camera-integral VTRs of the same type in near areas. It is a serious problem that a remote controller handled by a user to control his own camera-integral VTR may happen to operate VTRs of others.

There is a proposal to add a unique ID signal that is exclusive to a particular set of a remote controller and an electronic appliance so that the remote controller can control only the electronic appliance that has the same ID signal.

In order to add an ID signal for exclusively identifying combination of a remote controller and an electronic appliance, both the remote controller and the electronic appliance must be assigned with the same ID. A conventional way was to register a certain ID in the electronic appliance and register the corresponding ID in the remote controller. However, registration of ID in both the electronic appliance and the remote controller is a troublesome task.

OBJECT AND SUMMARY OF THE INVENTION

It is therefore an object of the invention to provide an electronic appliance system, electronic appliance, and remote controller that are easy to register an identifying signal (ID).

According to the invention, there is provided an electronic appliance system comprising a remote controller operated by an instruction through entry means to generate and transmit a command signal, and an electronic appliance activated for a selective operation responsive to the command signal received from the remote controller, in which the remote controller includes ID signal generating means for generating a unique ID signal that is exclusive to the system and different from those of other systems, and the electronic appliance includes storage means for storing the ID signal, and in which the remote controller transmits the unique ID signal received from the ID signal generating means in response to an instruction through the entry means, and the electronic appliance receives the unique ID signal and stores it in the storage means.

The unique ID is assigned to the remote controller upon shipment from a factory. Thus, setting the unique ID for the electronic appliance system can be done only by registering the ID of the remote controller to the electronic appliance, such as camera-integral VTR.

For registration of ID, a stop key prepared in the remote controller is pressed. The stop key is not manipulated during operation of the camera and, even if it accidentally affects another appliance, the appliance merely stops its operation. Therefore, no serious problem occurs when the stop key is pressed.

When registration of ID finishes in success, a beep sound notifies the completion, and a set menu is set at "ID". This permits a user to begin manipulation of his remote controller by utilizing the ID function immediately after completion of the ID registration.

The above, and other, objects, features and advantage of the present invention will become readily apparent from the following detailed description thereof which is to be read in connection with the accompanying drawings.

DESCRIPTION OF THE PREFERRED EMBODIMENT

Figure 1:
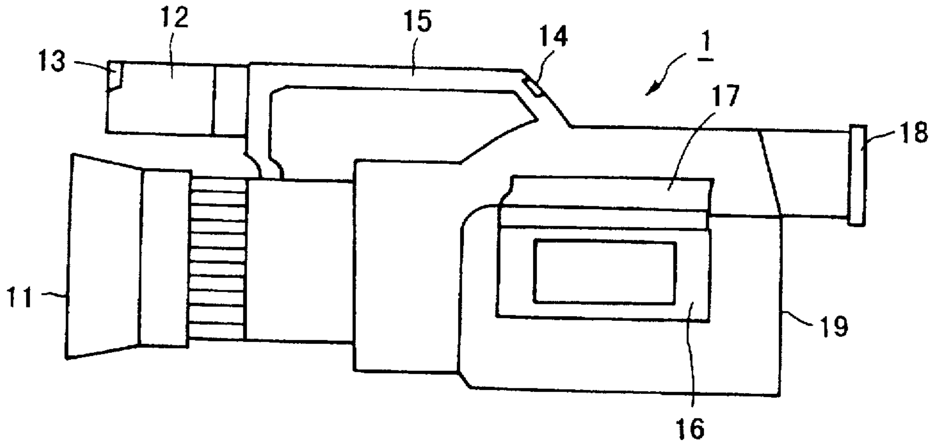
FIG. 1 is a side elevation of a video camera to which the invention is applied.

An embodiment of the invention is described below with reference to the drawings. In FIG. 1, numeral 1 denotes the entirety of a camera-integral VTR. The camera-integral VTR 1 has a lens 11 on its front end, through which an image of an object is introduced. The camera-integral VTR 1 also has formed, in its front end portion, a microphone 12 through which external sounds are introduced. The microphone 12 supports a remote control front detector 13 at its front end for detecting infrared rays from a remote controller 2. A remote control rear detector 14 is provided on the back face of a handle 15.

The camera-integral VTR 1 has a cassette holder at one side. The cassette holder 16 has a cover and releasably holds a tape cassette (not shown). The tape cassette is of a type with the tape width of ¼ inch. The tape cassette may be one called MIC (Memory In Cassette) having a built-in memory. An operation panel is located above the cassette holder 16, on which record, play, rewind, fast-forward, and other keys are provided.

Figure 2:
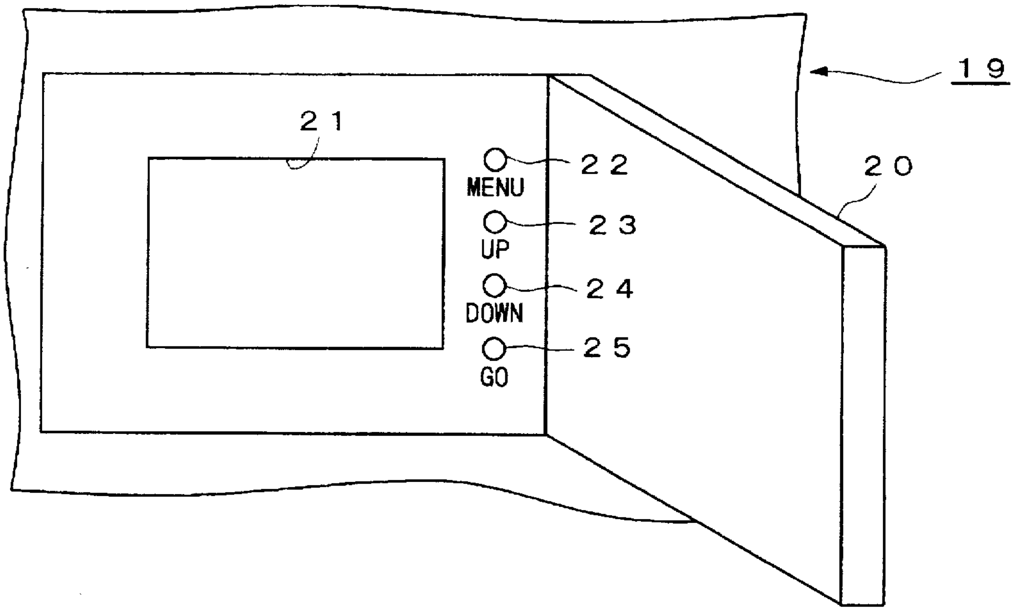
FIG. 2 is a perspective view for use in explanation of a video camera to which the invention is applied.

The camera-integral VTR 1 has a view finder 18 and a battery holder 19 in its back end portions. The battery holder 19 has a cover 20 as shown in FIG. 2. When the cover 20 is opened, a battery entrance 21 is exposed, and one or more batteries (not shown) are inserted through the battery entrance 21. Provided near the battery entrance 21 are a menu key 22, cursor up key 23, cursor down key 24 and an execute key 25.

Figure 3:
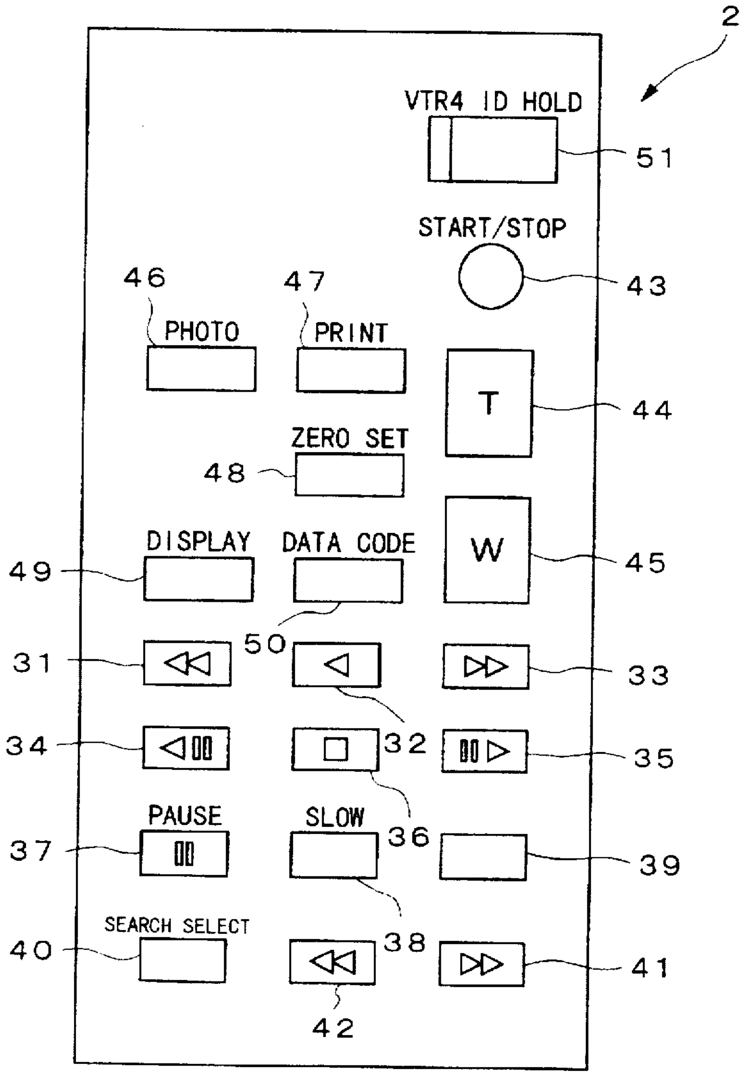
FIG. 3 is a plan view of a remote controller to which the invention is applied.

The camera-integral VTR 1 can be controlled by a remote controller. FIG. 3 shows the remote controller 2 on which prepared are a rewind key 31, play key 32, fast-forward key 33, forward frame feed key 34, backward frame feed key 35, stop key 36, and so forth. Also prepared are a temporary stop key 37, slow play key 38 and one or more keys for play at a modified speed, such as double-speed play key 39. Further provided are keys for camera work, such as start-stop key 43, zoom keys 44, 45; a photo key 46 for taking a still image; a print key 47 for printing out the image; a zero set memory key 48 for resetting a position counter; an image display key 49; and a data code key 50 permitting a user to obtain information on the camera, such as the day and the time of record, during reproduction of an image.

The remote controller 2 has an ID function to limit its remote control operation only to a predetermined particular appliance. A switch 51 is used to preset the ID function. When the switch 51 is set at "VTR4", the remote controller 2 is allowed to remote-control any appliances of the same type like a typical remote controller. When the switch 51 is set at "ID", its remote control is effective only for a particular appliance in record. When the switch 51 is set at "HOLD", its remote control is inactive.

For registration of ID, the cover 20 of the battery holder 19 of the camera-integral VTR 1 is opened so that the menu key 22 can be manipulated.

Figure 4:
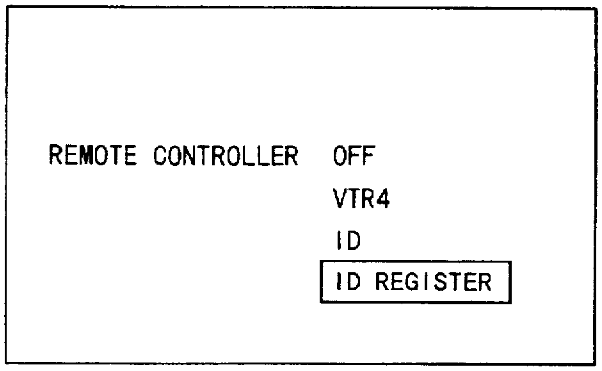
FIG. 4 is a schematic diagram for use in explanation of a camera-integral VTR to which the invention is applied.

When the menu key 22 is pressed, a menu concerning "remote control" appears in the view finder 18 as shown in FIG. 4. "Off" makes VTR 1 to reject control by any remote controller. "VTR4" permits VTR 1 to accept normal remote control by remote controllers of the associated type. "ID" V permits VTR 1 to be controlled only by a remote controller exclusively associated by ID. Without registration of ID, VTR 1 rejects remote control by such remote controllers. "ID register" is a key used to register ID.

Upon actual registration of ID, the cursor up key 23 and the cursor down key 24 are pressed to set the set menu at "ID register".

Figure 5:
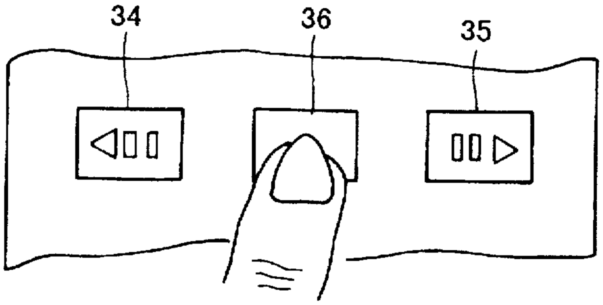
FIG. 5 is a perspective view for use in explanation of a camera-integral VTR to which the invention is applied.
Figure 6:
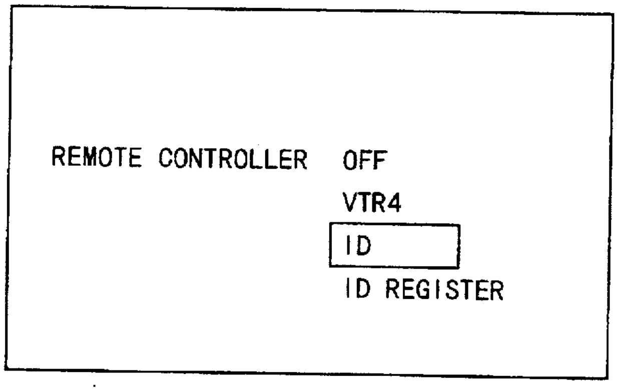
FIG. 6 is a schematic diagram for use in explanation of a camera-integral VTR to which the invention is applied.

While the set menu exhibits "ID register", the switch 51 of the remote controller 2 is set at "ID", and the stop key 36 of the remote controller 2 is pressed as shown in FIG. 5. The remote controller 2 has assigned a unique ID before shipment, and pressing the stop key 36 causes the ID to be registered in the camera-integral VTR 1. To cancel the registration mode without actually registering the ID, the user may press the execute key 25, menu key 22, cursor up key 23 or cursor down key 24. If the execute key 25, or the menu key 22, is pressed, the set menu is reset to "ID".

After registration of the ID is completed, the set menu is reset to "ID". After the switch 51 of the remote controller 2 is set at "ID" while the set menu exhibits "ID", the camera-integral VTR 1 rejects remote control through other remote controllers other than that with registration of the ID. Completion of ID registration may be noticed to the user by a beep.

As explained above, since the remote controller 2 according to the invention has already assigned a unique ID before shipment, setting of ID in the system can be done by registering the ID of the remote controller 2 in the camera-integral VTR 1 alone. That is, it is not necessary to registering the ID both in the camera-integral VTR 1 and in the remote controller 2.

The stop key 36 of the remote controller 2, which is pressed for registering ID, has no use in operation of the camera. Even if the stop key 36 affects other appliances of other systems, the affection is limited only to stopping the appliances, and no serious problem occurs.

Since the set menu is automatically reset to "ID" together with the notice by a beep sound upon completion of ID registration, the user can start operation of the remote controller using the ID function immediately after completion of ID registration.

Figure 7:
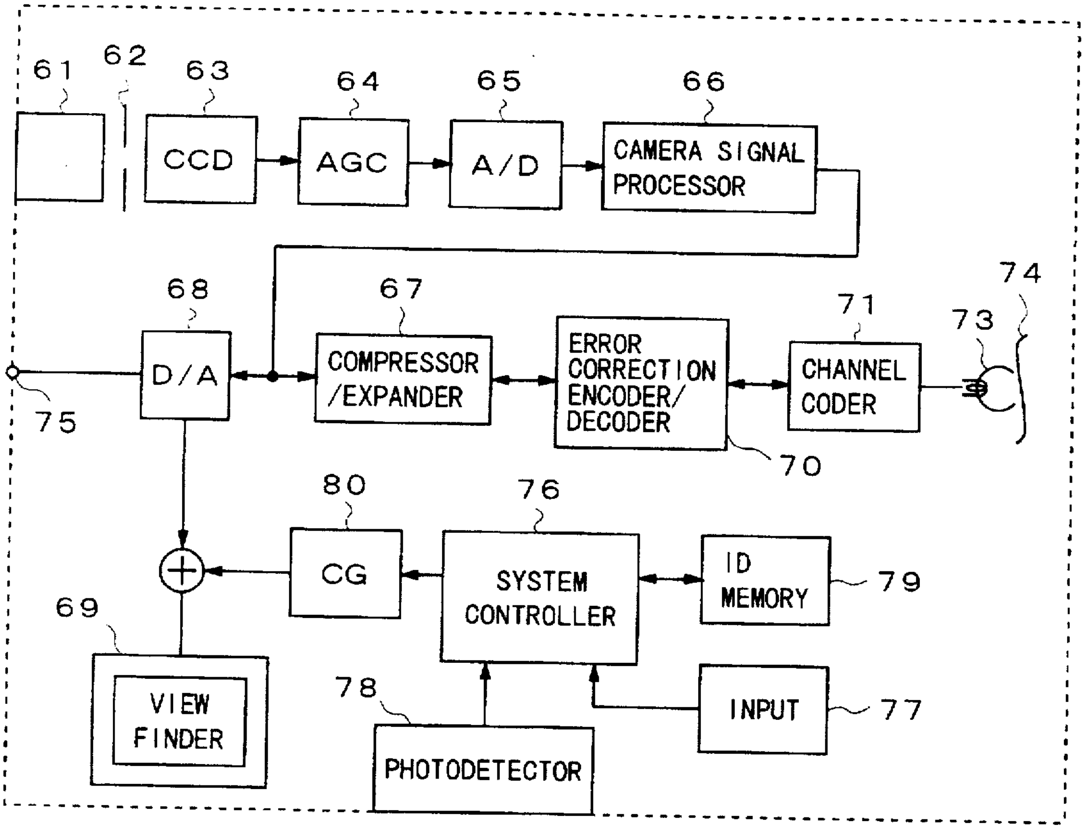
FIG. 7 is a block diagram of a camera-integral VTR to which the invention is applied.

FIG. 7 shows a block diagram of the camera-integral VTR 1. During a record operation, light from an object is introduced through the lens 61. The light passes through an iris 62 and forms an image on a photodetector of a CCD imaging device 63 which photoelectrically converts the image. Output from the CCD imaging device 63 is supplied to an A/D converter 65 through an AGC circuit 64, and the image signal is converted into a digital form there. Output of the A/D converter 65 is supplied to a camera signal processing circuit 66. The camera signal processing circuit 66 produces a component color vide signal from the image signal by signal processing such as gamma correction and aperture correction.

Output of the camera signal processing circuit 66 is supplied to both a compress/expand circuit 67 and a D/A converter 68. Output from the D/A converter 68 is supplied to the view finder 69 on which the image can be monitored.

The video signal from the camera signal processing circuit 66 is compressed by DCT conversion and length-variable coding in the compress/expand circuit 67. Output of the compress/expand circuit 67 is supplied to an encoder/decoder circuit 70 and encoded into an error correction code. Output of the encoder/decoder circuit 70 is supplied to a channel coder 71 which modulates the data to be recorded. Output of the channel coder 71 is supplied to a head 73, and the digital video signal is recorded on a magnetic tape 74 by the head 73.

During reproduction, the signal recorded on the magnetic tape 74 is reproduced by the head 73 and supplied to the channel coder 71. The channel coder 71 demodulates the reproduced data and supplies its output to the encoder/decoder circuit 70. Output from the encoder/decoder circuit 70 after error correction processing is supplied to the compress/expand circuit 67 and expanded into the original video signal. Output of the compress/expand circuit 67 is supplied to the D/A converter 68 and output through an output terminal 75.

A system controller 76 controls the entirety of the camera-integral VTR 1. The system controller 76 receives instructions through entry keys 77 and an output from a photodetector 78 which receives an infrared ray signal from the remote controller 2. Output of the system controller 76 is supplied to a character generator 80 that produces a display signal. The display signal is superposed on the signal sent to the view finder 69. Thus, various kinds of information can be displayed on the view finder.

The system controller 76 includes ID memory 79 for storing the ID as explained above. The ID memory 79 is non-volatile memory so that the registered ID is not lost by removal of power.

Figure 8:
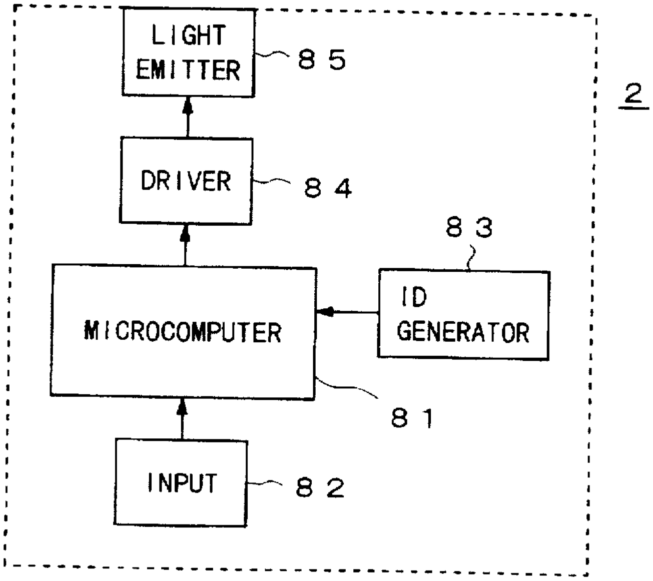
FIG. 8 is a block diagram of a remote controller to which the invention is applied.

FIG. 8 is a block diagram of the remote controller 2. The remote controller 2 has a microcomputer 81 which receives instructions through entry keys 82. An ID generator circuit 83 is connected to the microcomputer 81. The unique ID is assigned to the ID generator circuit 83 before shipment of the remote controller 2. The ID is a 14-bit code selected from different $2^{14}$ kinds of codes. The ID generator circuit 83 may be either memory or dip switches. The micro computer 81 makes a command signal and supplies it to a light emitter 85 through a driver 84. The light emitter 85 send the command signal in form of an infrared ray signal.

Figure 9:
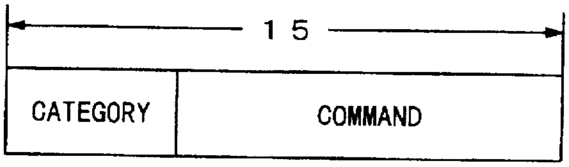
FIG. 9 is a schematic diagram for use in explanation of a remote controller to which the invention is applied.
Figure 10A:
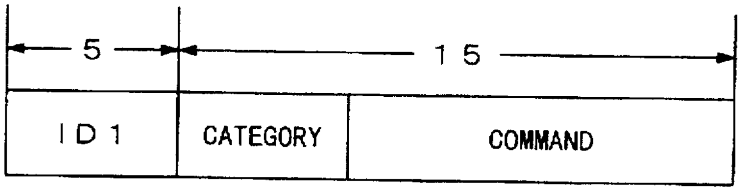
FIGS. 10A to 10C are schematic diagrams for use in explanation of a remote controller to which the invention is applied.
Figure 10B:
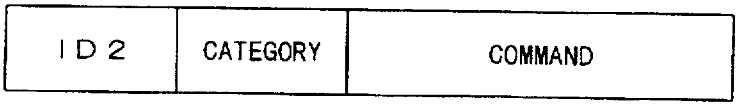
Figure 10C:
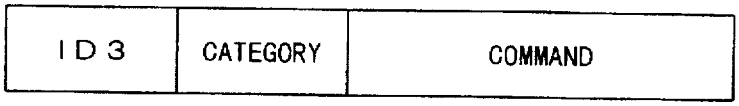

The command signal from the remote controller 2 is output in 15 bits including a category code and a command, as shown in FIG. 9, when the switch 51 is set at "VTR4". The block of 15 bits determines an operation by one command.

When the switch 51 is set at "ID", ID1 through ID3 each comprising five bits are added to 15 bits including the category code and the command. As explained above, the ID includes 14 bits. ID1 through ID3 of these three blocks make 15 bits. One-bit parity is added to the ID, and the resulting ID of 15 bits including the parity is involved in three blocks of ID1 through ID3. Three blocks each comprising 15 bits determine an operation by one command.

Figure 11:
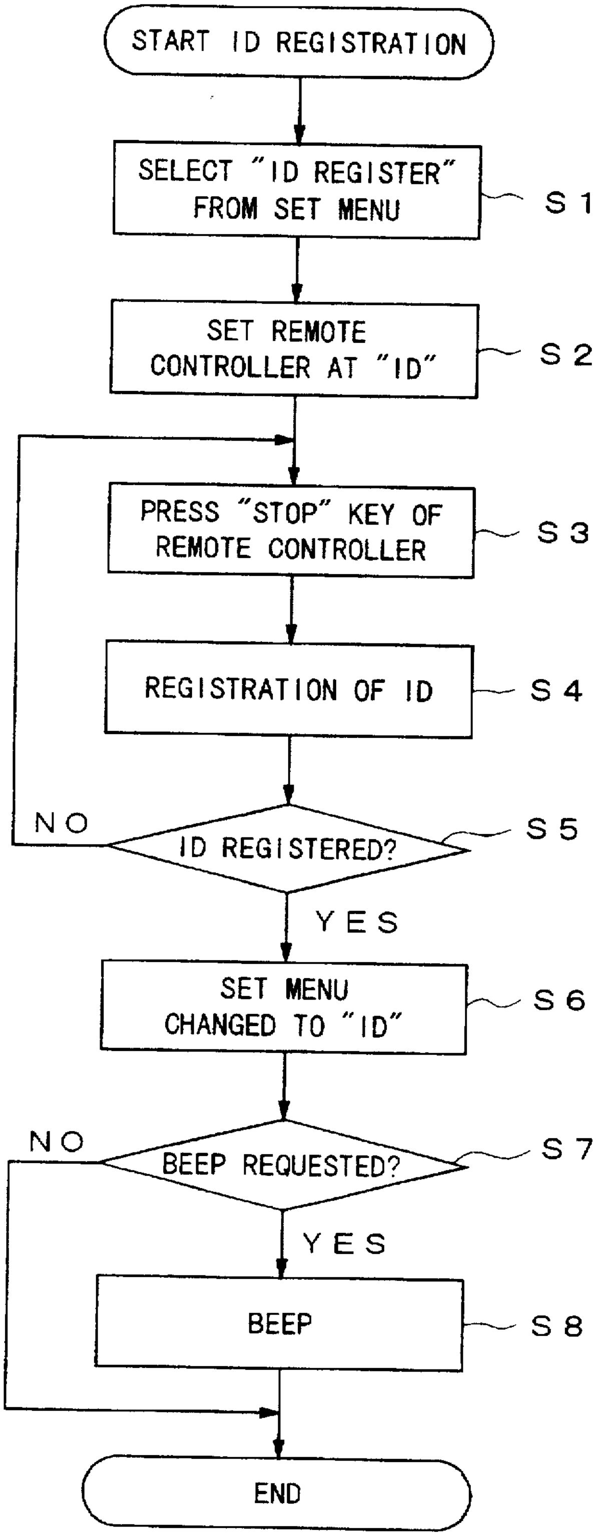
FIG. 11 is a flow chart for use in explanation of registration of an ID.

FIG. 11 is a flow chart of the process for ID registration. The set menu is set at "ID register" by instructions through the menu key 22, cursor up key 23 and cursor down key of the camera-integral VTR 1 (step S1).

After "ID register" is selected from the set menu, the switch 51 of the remote controller 2 is set at "ID" (step S2), and the stop key 36 of the remote controller 2 is pressed (step S3). As a result, the process for registration goes on, and the unique ID assigned to the ID generator circuit 83 of the remote controller 2 before shipment is stored in ID memory 79 in the camera-integral VTR 1 (step S4).

When the process for registration is completed by finally detecting whether registration of ID has been completed (step S5), the set menu is reset at "ID" (step S6). If the beep means is set ON (step S7), completion of registration is noticed by a beep sound (step S8)

Figure 12:
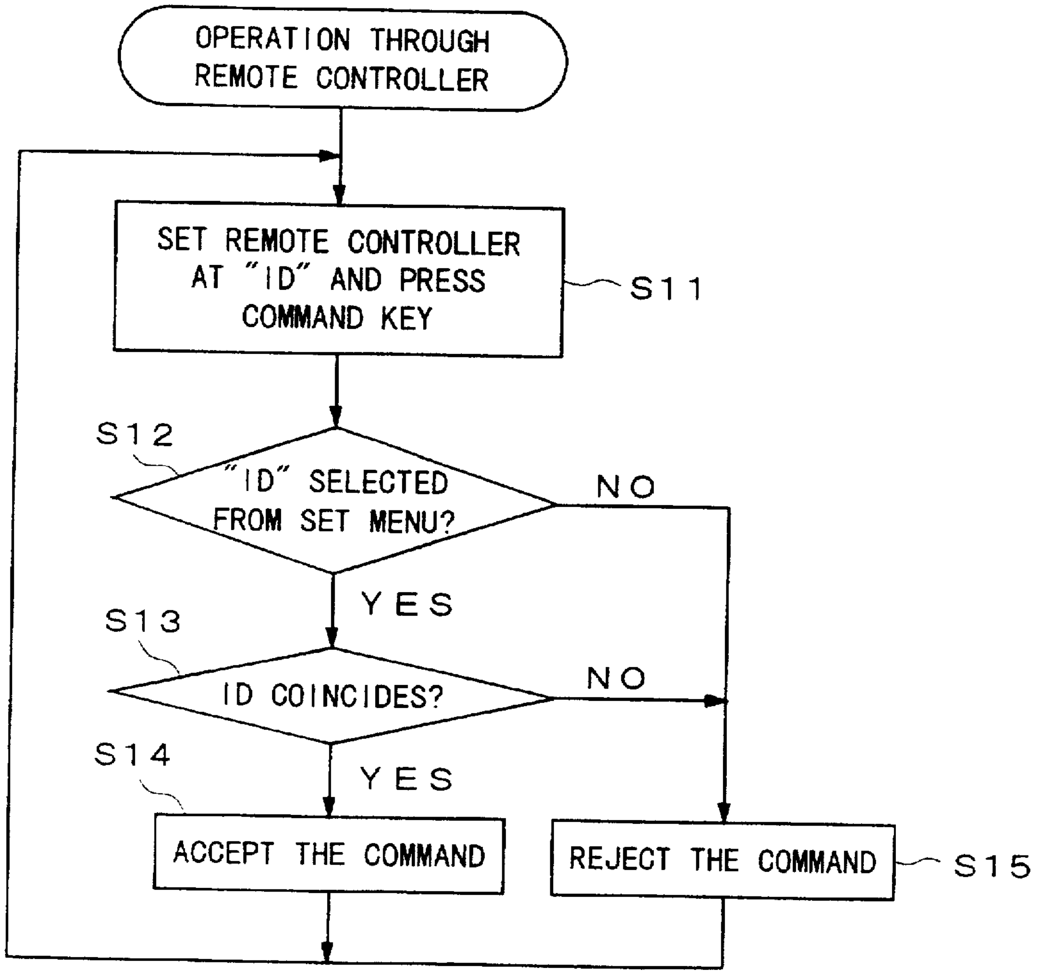
FIG. 12 is a flow chart for use in explanation of a command device.

FIG. 12 is a flow chart of the process for remote control using the ID function. The switch 51 of the remote controller 2 is set at "ID", and a desired key of the remote controller 2 is pressed (step S11). If the set menu of the camera-integral VTR is set at "ID" (step S12), it is confirmed whether the ID sent from the remote controller 2 coincides with the ID stored in the ID memory 79 (step S13). If so, the command is accepted (step S14). If not, the command is neglected (step S15).

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An electronic appliance system including a remote controller responsive to an instruction through entry means to generate and transmit a command signal, and an electronic appliance receiving the command signal and set for an operation specified by the command signal, comprising:

said remote controller having an identifying signal generating means for generating a unique identifying signal that is exclusive to said system and different from those of other systems;

said electronic appliance having memory means for storing said identifying signal, wherein said identifying signal is not present in said memory means, or any other portion of said electronic appliance, prior to an initial transmission of said identifying signal from said remote controller to said electronic appliance;

said remote controller being responsive to said instruction through said entry means to transmit said unique identifying signal from said identifying signal generating means;

said electronic appliance receiving said unique identifying signal and storing it in said memory means; and said electronic appliance being selectively operable in a first mode in which said electronic appliance is responsive only to commands from said remote controller generating said unique identifying signal, and a second mode in which said electronic appliance is responsive to commands from a multiple of remote controllers of an associated type without regard to said unique identifying signal.

2. A remote controller for controlling one or more electronic appliances, and operable to generate and transmit a command signal in response to an instruction through entry means, comprising:

identifying signal generating means for generating a unique identifying signal that is exclusive to said remote controller and different from those of other remote controllers; and said remote controller transmitting said unique identifying signal from said identifying signal generating means to one or more of said electronic appliances in response to said instruction through said entry means, said remote controller being operable to be set in a first mode for generating a command signal and a second mode for generating another command signal to which said identifying signal is added, and said remote controller generating said another command signal including said identifying signal when it is set in said second mode;

wherein when said remote controller is set in said first mode said remote controller does not transmit said identifying signal in response to an instruction through said entry means; and wherein when said remote controller is set in said first mode said remote controller controls a multiple of said electronic appliances without regard to said unique identifying signal and when said remote controller is set in said second mode said remote controller controls only said one or more electronic appliances to which said unique identifying signal has been transmitted.

3. An electronic appliance receiving command signals from one or more remote controllers and activated for selected operations responsive to the received command signals, comprising:

storage means for storing an identifying signal, wherein said identifying signal is not present in said storage means, or any other portion of said electronic appliance, prior to an initial reception of said identifying signal from one or more of said remote controllers; and said electronic appliance receiving said identifying signal and storing said identifying signal in said storage means;

wherein said electronic appliance is selectively operable in a first mode in which said electronic appliance is responsive only to command signals from said remote controllers generating said unique identifying signal and a second mode in which said electronic appliance is responsive to command signals from a multiple of remote controllers of an associated type without regard to said unique identifying signal.

4. The electronic appliance according to claim 3, wherein said storage means is non-volatile memory.

* * * * *